UNITED STATES PATENT OFFICE.

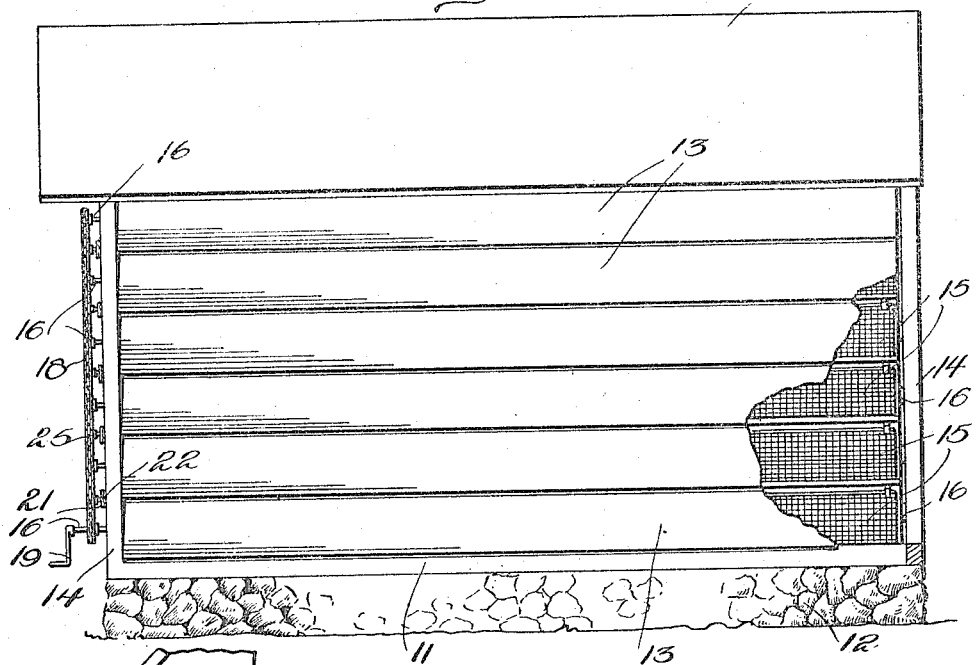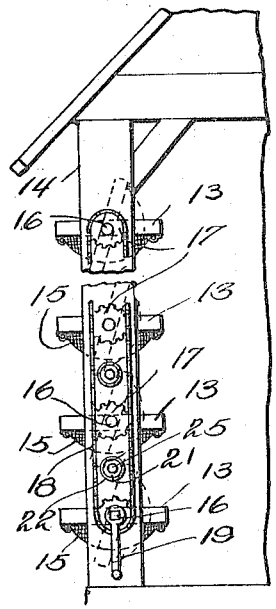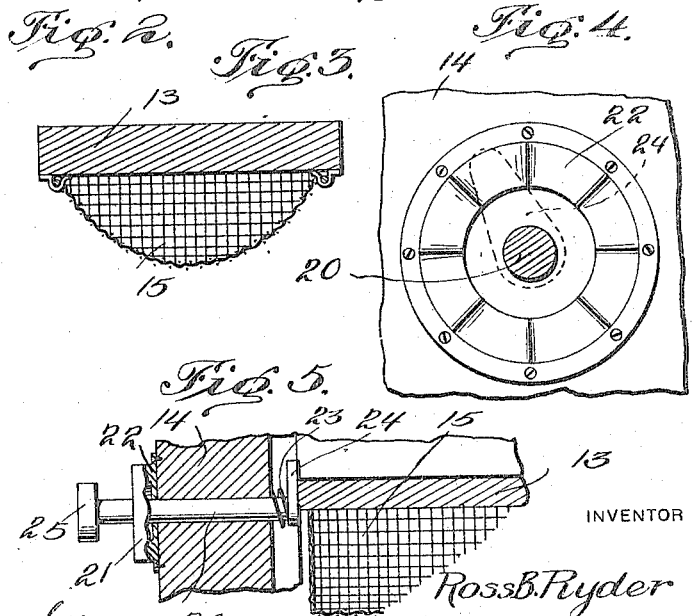

ROSS B. RYDER, OF ALTAMONT, SOUTH DAKOTA.

DRYING-HOUSE.

1,213,957.  Specification of Letters Patent.  Patented Jan. 30, 1917.

Application filed January 29, 1916. Serial No. 75,121.

*To all whom it may concern:*

Be it known that I, Ross B. Ryder, a citizen of the United States, residing at Altamont, in the county of Deuel and State of South Dakota, have invented certain new and useful Improvements in Drying-Houses, of which the following is a specification.

This invention relates to an improved drying house and the principal object of the invention is to provide a house having fruit receptacles so constructed that they form a part of the walls of a building and to further so construct these receptacles that they may be turned in a desired direction so that in case of rain or snow, fruit can be positioned within the house and to further so mount these receptacles that the fruit may be left either exposed to the sun while drying or shaded by the boards forming part of the receptacles while drying if preferred.

Another object of the invention is to provide improved means for mounting these receptacles, means being provided for releasably holding the receptacles at the desired angle.

Another object of the invention is to provide a drying house which will be simple in construction and easy to set up, the parts being comparatively few in number and easy to assemble.

This invention is illustrated in the accompanying drawings, wherein:—

Figure 1 is a view in side elevation of the improved drying house. Fig. 2 is a fragmentary view showing the drying house in front elevation. Fig. 3 is a transverse sectional view through one of the receptacles. Fig. 4 is a fragmentary view of one of the locking members for releasably holding the receptacles at the desired angle. Fig. 5 is a fragmentary sectional view showing the manner of releasably holding a receptacle at the desired angle.

This house is provided with a roof 10 and with side walls 11 which rest upon the foundation 12, the side walls being provided with boards 13 which are pivotally mounted between the joists 14 forming the ends of the walls. These boards 13 further form the protecting walls of the wire receptacles 15 which are connected with the boards 13 as shown in Fig. 3. The supporting shafts 16 at one end of the boards 13 extend through the joists 14 and carry sprocket wheels 17 about which a sprocket chain 18 passes. The lower shaft 16 is elongated as shown in Fig. 1 and carries a crank handle 19 so that by turning this handle, the sprocket chain can be moved and the angle of the boards thus varied. In other words, these boards could extend as shown in Fig. 2 or could be tilted either to bring the wire receptacles outward or to bring the boards outward as shown in Fig. 1. When in the position shown in Fig. 1, the edges of the boards will overlap in the manner of weather boards thus forming a rain and snow shield which will protect the fruit in the receptacles and prevent it being spoiled. When in the position shown in Fig. 2 the fruit will be shaded but at the same time will be exposed so that it can be dried. With certain classes of fruit it is necessary that it be placed in the sun so that it will dry quickly and if this type of fruit is placed in the receptacles, the boards will be turned to bring the receptacles outward where the fruit contained therein will be exposed to the sun. In order to releasably hold the boards at the adjusted angle there has been provided locks having stems 20 which are rotatably mounted in the joists 14 and are provided with clutch collars 21 which engage the clutch collars 22 carried by joists 14 and are yieldably held in engagement therewith by the springs 23 positioned about the inner ends of the stems and engaging the fingers 24 which engage the boards 13 as clearly shown in Fig. 5. A head 25 is provided so that these locks can be readily moved out of engagement with the boards and after the boards have been moved to the desired angle again moved into engagement with the ends of the boards and by frictional engagement therewith holds the boards at the desired angle.

The operation of this drying house is very simple, the fruit being placed in the receptacles and the receptacles then placed at the desired angle so that the fruit will either be exposed to the sun or shaded by the boards. If it should rain while the fruit is being dried, the locks can be released and after the crank handle 19 has been turned to swing the receptacles inwardly with the boards in overlapping relation to resemble weather boards, the locks could be returned to the operative position and the boards would then be held in this position until the locks were again released and the boards returned to the proper position for drying the fruit. I have therefore provided a drying house which is simple of construction and which is very easy to operate.

What is claimed is:—

1. A drying device comprising a structure having walls including end beams, boards positioned between said end beams, pivot pins for said boards, the pivot pins at one end extending through the end beams, perforated receptacles carried by said boards, means for rotating one of said pivot pins to adjust the angle of the board carried thereby, means for transmitting rotary movement of said pivot pins to the remaining pivot pins whereby said boards will be simultaneously adjusted, and means for releasably holding said boards in an adjusted position.

2. A drying device of the character described comprising a structure having a wall provided with end beams, boards positioned between said end beams and pivotally connected therewith, the boards being positioned for overlapping relation when in one position, perforated receptacles carried by said boards, means for moving said boards to an adjusted position, and means for releasably holding said boards in an adjusted position.

3. A drying device of the character described comprising a structure having a wall including end beams, boards pivotally mounted between said end beams, perforated receptacles carried by said boards, means for moving said boards to an adjusted position, and means for releasably holding the boards in an adjusted position.

4. A drying device of the character described comprising a structure including a wall provided with end beams, boards pivotally mounted between said end beams, perforated receptacles carried by said boards, and means for adjusting the angle of said boards.

5. A drying device comprising a structure having a side wall provided with end beams, boards pivotally mounted between said end beams, clutch pins rotatably mounted in one of said beams and provided with heads at their inner ends for engaging said boards, means for yieldably holding the heads of said pins in engagement with said boards, means for releasably holding said pins in a set position, and means for adjusting the angle of said boards.

6. A drying device comprising a structure including a wall having pivotally mounted boards, perforated receptacles carried by said boards, and means for adjusting the angle of said boards.

In testimony whereof I affix my signature in presence of two witnesses.

ROSS B. RYDER.

Witnesses:
 SOREN DRAKE,
 H. H. GUERNSEY.

Copies of this patent may be obtained for five cents each, by addressing the "Commissioner of Patents, Washington, D. C."